J. H. GUEST,

Assignor, by mesne assignments, to A. GUEST.

Automatic Fire-Alarm Telegraph.

No. 8,618. Reissued Mar. 11, 1879.

Witnesses:
D. P. Cowl
W. E. Chaffee

Inventor
J. H. Guest.

J. H. GUEST,

Assignor, by mesne assignments, to A. GUEST.

Automatic Fire-Alarm Telegraph.

No. 8,618. Reissued Mar. 11, 1879.

Witnesses:
D. P. Cowl
W. E. Chaffee

Inventor:
J. H. Guest

J. H. GUEST,

Assignor, by mesne assignments, to A. GUEST.

Automatic Fire-Alarm Telegraph.

No. 8,618. Reissued Mar. 11, 1879.

Witnesses:
D. P. Cowl
M. E. Chaffee

Inventor:
J. H. Guest.

J. H. GUEST,
4 Sheets—Sheet 4.
Assignor, by mesne assignments, to A. GUEST.
Automatic Fire-Alarm Telegraph.
No. 8,618.
Reissued Mar. 11, 1879.
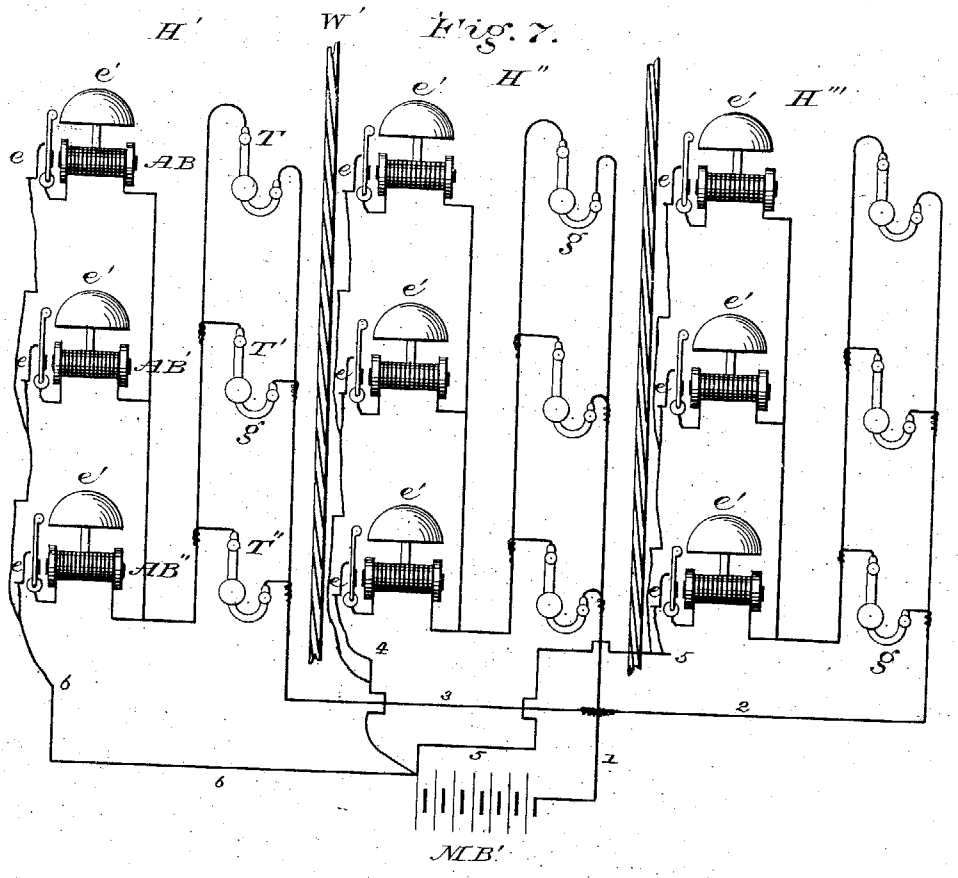
Witnesses:
D. P. Cowl
W. C. Chaffee
Inventor:
J. H. Guest.

UNITED STATES PATENT OFFICE.

JOHN H. GUEST, OF BROOKLYN, NEW YORK, ASSIGNOR, BY MESNE ASSIGNMENTS, TO AUGUSTA GUEST, OF SAME PLACE.

IMPROVEMENT IN AUTOMATIC FIRE-ALARM TELEGRAPHS.

Specification forming part of Letters Patent No. 182,020, dated September 12, 1876; Reissue No. 8,618, dated March 11, 1879; application filed January 29, 1879.

*To all whom it may concern:*

Be it known that I, JOHN H. GUEST, of Brooklyn, in the county of Kings and State of New York, have invented certain new and useful Improvements in Automatic Fire-Alarm Telegraphs; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The ordinary automatic fire-alarm telegraphs as heretofore constructed and used (examples of which may be seen in several of my prior patents) are not well adapted for use in tenement-houses, "French-flat" houses, or hotels, in that the alarm is arranged to be sounded in one apartment only, the apartment usually selected being that of the head of the house.

The object of this invention is to provide a system especially applicable to hotels and tenement and French-flat houses by so arranging the circuits and apparatus that upon the outbreak of a fire an alarm shall be automatically sounded in each room or on each flat or story, as desired, and, if desired, the locality be designated upon an annunciator placed in the rooms of the janitor, or in a central office, or at any other desired spot.

To this end the invention consists in those devices and combinations of devices, and those arrangements of batteries and circuits, more specifically hereinafter described and claimed.

Figure 1:
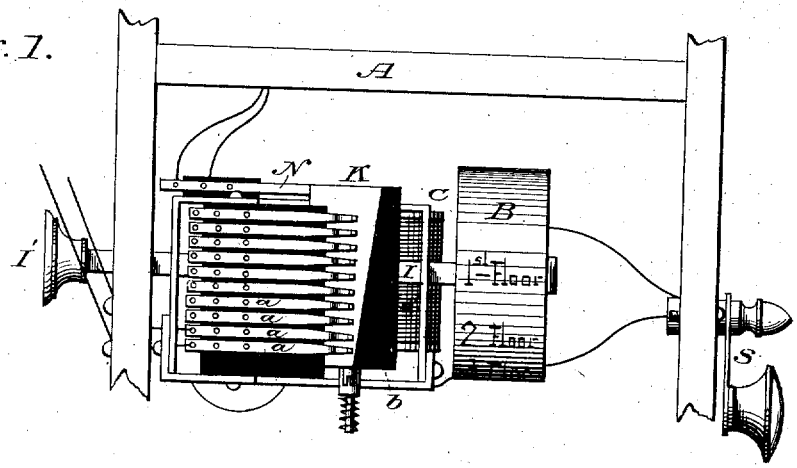
Figure 2:
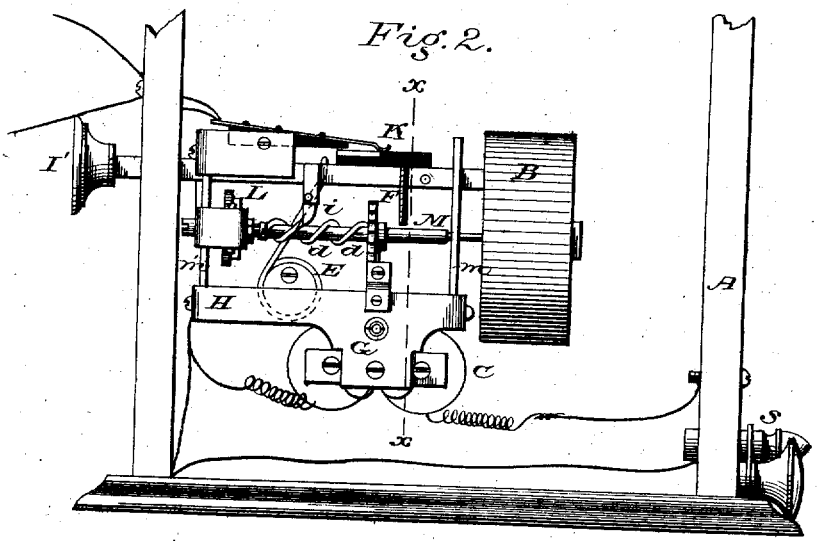
Figure 3:
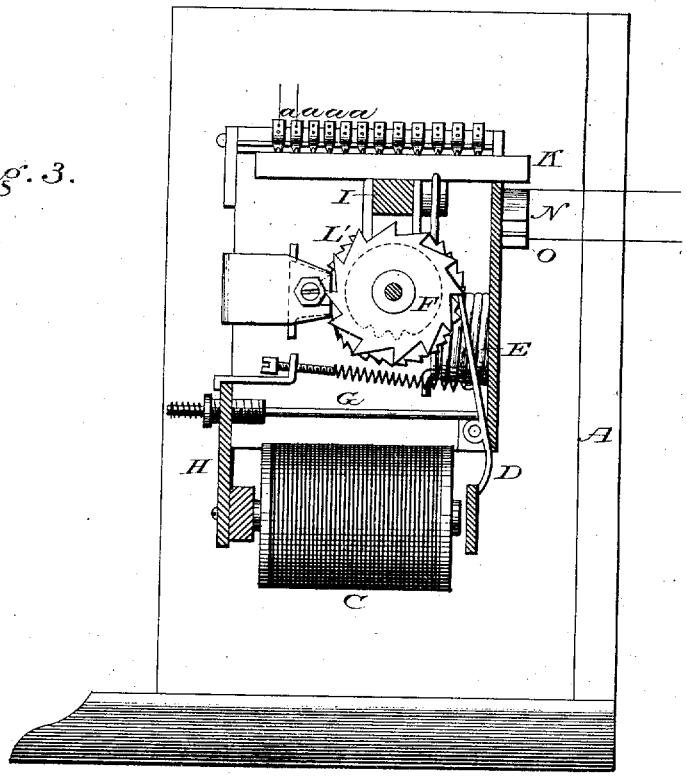
Figure 4:
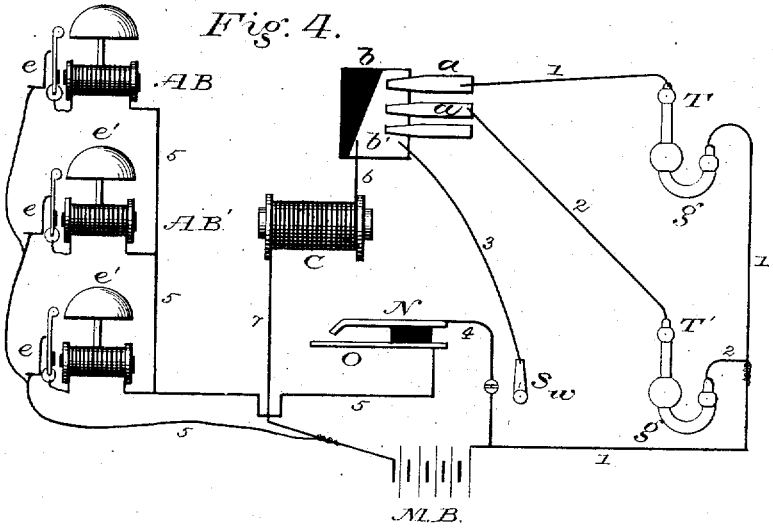
Figure 5:
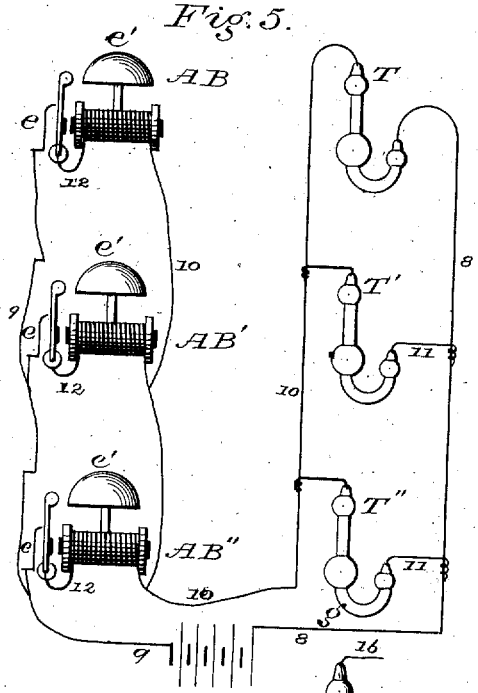
Figure 6:
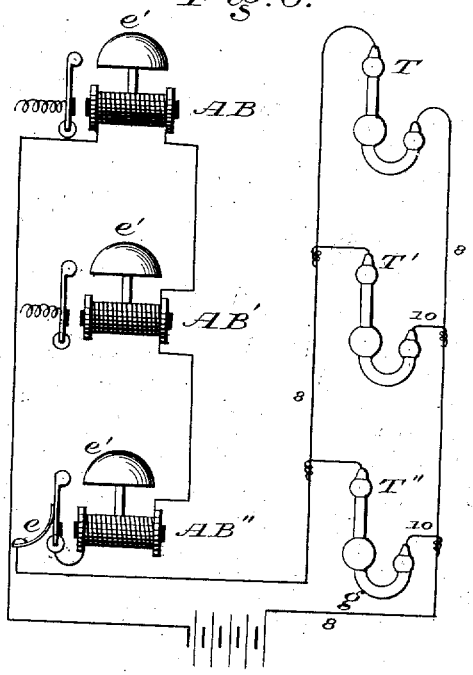
Figure 8:
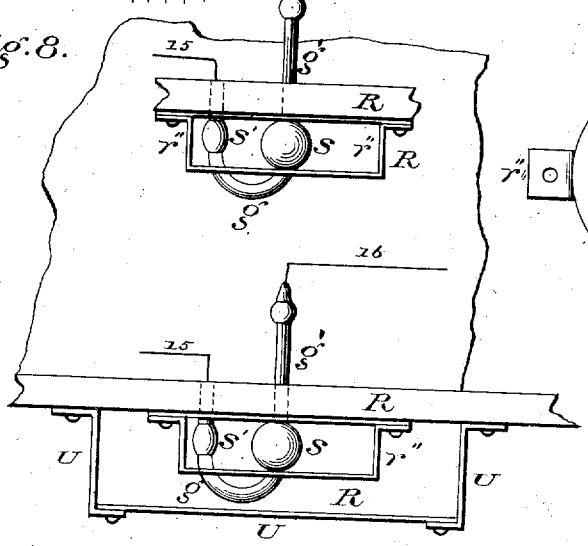
Figure 9:
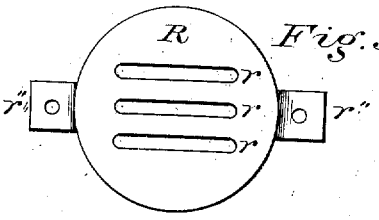
Figure 10:
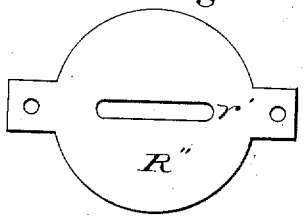

In the drawings, Figure 1 is a plan view of my improved annunciator; Fig. 2, a side view thereof; Fig. 3, a section on line *x x*, Fig. 2, looking toward the left end of Fig. 2. Fig. 4 is a diagram of the circuits from the thermostats and battery through the annunciator to the alarms. Fig. 5 is a diagram of circuits connecting a series of alarms and thermostats, the annunciator being omitted. Fig. 6 is a modification of the arrangement shown in Fig. 5. Fig. 7 is a diagram showing several buildings, each provided with its own series of alarms and thermostats, but all served from a common battery. Figs. 8, 9, and 10 are details showing my method of and devices for protecting the thermostats from accidental or designed injury.

In the annunciator, Figs. 1, 2, and 3, A is any suitable case or framing, provided with the usual front, (not here shown,) having an aperture, through which may be seen one of the indications on the rotating cylinder B when such cylinder has been brought into proper position. B is mounted on and rotates with an axis, M, having its bearings in plates *m m'*. On M is also secured a detent, F, held or released, according to the circumstances of the case, by the detent and armature-lever D of the magnet C and an escapement-wheel, L, in which plays an anchor to regulate the speed of rotation of the shaft. Upon the shaft is secured a wire, *d*, forming a screw-thread thereon, or a screw-thread may be cut therein. Arranged above the shaft M, and sliding in the same plates, is a slide-rod, I, having a button, I', on the outside of the case for its easy manipulation. From the under side of this rod depends a pivoted dog, *i*, whose lower end almost touches the shaft M. One side is beveled or rounded, so as to slide over the screw-thread, the other being straight, so as to catch thereon and engage therewith. A coiled spring, E, has one end rigidly secured, while the other projects upwardly and engages with the slide-rod. These parts constitute the motive power of the cylinder B.

If the slide I be out at full length, and then be forced into the case, as shown in Fig. 2, the dog *i* will bend upward and pass over the screw-thread. At the same time the spring E is compressed, and will operate, if not restrained, to throw I back, when the dog, not being able to slide over the screw, will bear against it, and cause the shaft M to rotate. Upon the slide I is secured a plate, K, composed of a conducting portion, *b'*, and an insulating portion, *b*, so arranged that the insulating portion at one end, upon the movement of the slide I and plate K, shall pass under the contact-springs *a a a*, &c., at one end before it does at the other, or, in other words, that it shall be brought under the springs in succession.

The arrangement here shown is to arrange the insulating and conducting portions with an oblique edge. It is evident, however, that this edge might be straight and the springs be set obliquely. From each spring a wire leads to a locality to be guarded, there being as many springs as there are spots to be signaled from. The circuits are as arranged in Fig. 4. Suppose T and T′ to be any suitable style of thermostats, arranged on different floors of a building, there being alarms A B A B′ on the same floors. A circuit leads from each thermostat to its appropriate spring, thence through the metallic part *b′* of plate K to the magnet C and to the battery. Upon any thermostat closing circuit the current flows through the magnet C, causing it to attract its armature and armature-lever D, releasing the shaft M. This allows spring E to act and to retract slide I, which, in turn, causes the rotation of shaft M and cylinder B. As soon, however, as slide I has been retracted sufficiently far to bring *b* under the spring of the thermostat closing the circuit, the circuit is broken, the armature falls away from the magnet, and the armature-lever stops the rotation of the shaft and cylinder. The designations on the cylinder are so arranged relatively that the designating the location of the thermostat originally closing the circuit is then opposite the opening in the case, so as to indicate such locality. This would give an indication, however, only at the place where the annunciator was located. In order, then, to sound an alarm at other places, I arrange upon an insulating-block two springs, N O, Figs. 1, 3, 4, normally separated from each other, and in a circuit leading from the battery to the alarms A B A B′. These springs are so arranged that upon the retraction of slide I the plate K shall press upon N, and cause it to close circuit with O to the alarms through 4 N O 5 5.

The alarm-circuit may, if desired, be continued to the office of a fire-patrol or a police-station. By these means a fire occurring in any room of a tenement or "flat-house" is first automatically signaled at the annunciator, and then the alarm is automatically given in all desired apartments.

As the apparatus may only be partially run down upon the occurrence of a fire, I provide a branch circuit through the magnet controlled by the switch, so that, after the several alarms have been given, the switch may be turned to throw the circuit through the magnet, and allow the shaft and cylinder to fully complete a revolution before being again wound up. The same object may be accomplished by a rod, G, projecting through the front of the case, and impinging at one end against the armature-lever above its fulcrum, as shown in Fig. 3.

In tenements and other kinds of houses having no central office it may be desired to dispense with the annunciator, and have the occurrence of a fire anywhere in the building signaled in all the rooms or upon all the floors. I illustrate a method of doing this in Fig. 5, where the thermostats T T′ T″ and alarms A B A B′ A B″ are on different floors—T″ and A B″ on the first, T′ and A B′ on the second, and T and A B on the third.

It is evident that there may be more or less floors, or, while they are here called floors, they may be rooms. A wire, 8, leads from the battery to the upper thermostat, T, from which a wire, 10, leads to the coil of the magnet of the alarm A B, which coil is connected with the bell-hammer and with spring *e* by wire 12. From the spring a wire, 9, leads back to the battery. Interposed in this circuit are alarms A B′ A B″ to any desired number, their coils being connected to main wire 10, and their springs to main wire 9. From this it will readily be seen that if the circuit be closed through any branch, it will be closed through all the magnets, and cause an alarm at each, one, however, only being in circuit at any one moment, thus diminishing the resistance in the circuit and enabling the work to be done with less battery than would otherwise be required.

In Fig. 6 I show as a modification a vibrating magnetic bell, A B″, used in the circuit, the remainder being simple one-stroke magnetic bells. This would cause a continuous alarm, the current through all being controlled after the circuit had been closed at any thermostat by the spring *e* and lever *e′*.

In Fig. 7 I illustrate a method of guarding several houses, one battery being used for all. H′, H″, and H‴ represent three houses separated by walls W′ W″. In each a thermostat and alarm are placed on each floor, or in each room. At some convenient point a battery, M B′, is located, as seen. Wires 3 6 connect such battery with the system in the first house, wires 1 4 with the system in second house, and wires 2 5 with the system in third house.

In each house the system is as shown in Fig. 5, or it may be as shown in Fig. 6, so that the occurrence of fire in any room or on any floor of a house will be signaled to all the rooms or floors of that house, but not to the others.

If desired, however, switches may be introduced, so as to signal to all the houses in a block upon the occurrence of a fire in any one.

All the alarms A B A B′, &c., illustrated here may be ordinary magnetic bells, or they may be alarms operated by clock-work, controlled by magnets.

While I have stated that T T′ T″ may be any suitable style of thermostat, it is preferable to use mercurial thermostats as more reliable. One form is illustrated on a large scale in Fig. 8, and its construction is as follows: S is the main bulb, containing the supply of mercury, which, on expansion, is to close circuit in the upright portion *g′* with the wire 16. From bulb S a neck, *g*, leads to a smaller bulb, S′, in which is a small quantity of mercury, through which the wire 15 passes to form connection with the main body of mercury. The bulb S′ thus practically forms a seal, preventing admission of air to the main or operative part of the mercury in case, as often happens, the seal between the wire and the glass is not perfectly air-tight. Ordinary thermostats have been plastered directly into the ceiling or else simply attached to and supported in position by the connecting-wires. In the first method they are too much protected to respond readily to changes of temperature in the place to be guarded, while the latter method not only gives a better exposure, but affords a firmer fastening.

To overcome these troubles I have devised the retaining and supporting device shown in Figs. 8, 9, and 10. This device consists of two plates, R and R″. The latter forms the base-plate, and is provided with one slot, *r′*, through which passes the smaller portion of the thermostat. Upon its opposite sides are lugs or ears with holes to receive screws or nails for fastening.

The plate R has upon opposite sides projections *r″*, bent at right angles to the main plate, and again bent outwardly at a distance equal to the diameter of S, screw-holes registering with those in R″ being made in the last-named outwardly-projecting parts. This plate R is provided with a central slot, *r*, on either side of which others may be arranged, if desired, the number not being material.

In use the plate R″ is passed down over the thermostat till it reaches the bulb S, while the plate R is passed up over the neck *g*, the neck protruding through the slot *r*. The screw-holes now register, and the whole is attached to the desired place, the thermostat being securely and rigidly held in position between the two plates, while the mercury-bulb is fully exposed to the action of the air.

When thermostats are used in tenement-houses there may be danger of injury, accidental or intended, from children or others putting matches under them or striking them. To obviate this a guard or plate, U, Fig. 8, is placed over the thermostat.

It is shown with open or perforated sides and a solid bottom; but it is evident that the bottom may be perforated or reticulated, and accomplish the same result of guarding from accident or intentional injury.

The bottom is considerably larger than the space occupied by the thermostat, which arrangement effectually prevents tampering with the thermostats.

Having thus described my invention, what I claim, and desire to secure by Letters Patent, is—

1. The combination, with a battery, one or more alarms, and a main circuit, of one or more branch circuits containing thermostats, the closure of the circuit in any branch by its thermostat operating all the alarms, substantially as set forth.

2. The combination, with a battery, a series of thermostats, an electrical circuit, and one or more ordinary magnetic alarms, of a self closing and breaking or vibrating magnetic bell, substantially as set forth.

3. The combination, with a battery, a series of alarms, and an open main circuit, of one or more branch circuits containing mercurial thermostats, consisting of a mercury-chamber, a sealing-chamber, S′, and a connecting-neck, substantially as described, so that the closure of the circuit in any branch operates any or all of the alarms, as set forth.

4. The combination, with several main circuits and several series of alarm-bells, thermostats, and branch circuits, of a single main battery and connections, as shown, the said main battery supplying the current for all the several main circuits, substantially as set forth.

5. The shield U, having solid face or bottom and perforated or open sides, substantially as set forth.

6. The combination, with the thermostat having two or more bulbs, S S′, and a connecting-neck, of inclosing-plates R and R″, substantially as shown and described, for inclosing the thermostat and retaining it in position, as set forth.

7. The combination, with the mercurial thermostat having two or more bulbs and a connecting-neck and a device, substantially as shown and described, for inclosing between plates R and R″, and retaining in position such thermostat, of the guard U, for protecting the exposed portions of the thermostat and retaining device, substantially as set forth.

8. The combination, with the mercurial thermostat having two or more bulbs and a connecting-neck, of a case constructed substantially as described, serving both to inclose the thermostat and support the same in position, substantially as set forth.

9. The combination of the cylinder B, shaft M, screw-thread *d*, slide I, with dog *i*, and spring E, substantially as set forth.

10. The combination, with cylinder B, of shaft M, with screw-thread *d*, slide I, with dog *i*, spring E, escapement L, and electro-magnetic stop D C, substantially as set forth.

11. The combination of the slide I, the plate K, with portions *b* and *b′*, the springs *a a*, the cylinder B and its motor-train, and the electro-magnetic stop, substantially as set forth.

12. The combination of the slide I, the cylinder B and its motor-train, the electro-magnetic stop, and the switch for causing the stop to allow the motor to complete a full revolution of the cylinder after a partial revolution thereof, substantially as set forth.

In testimony that I claim the foregoing as my own I affix my signature in presence of two witnesses.

J. H. GUEST.

Witnesses:
GEO. M. LOCKWOOD,
D. P. COWL.